April 18, 1967 W. STELZER 3,314,235
BRAKE PRESSURE CONTROL VALVE
Filed July 26, 1965 2 Sheets-Sheet 1
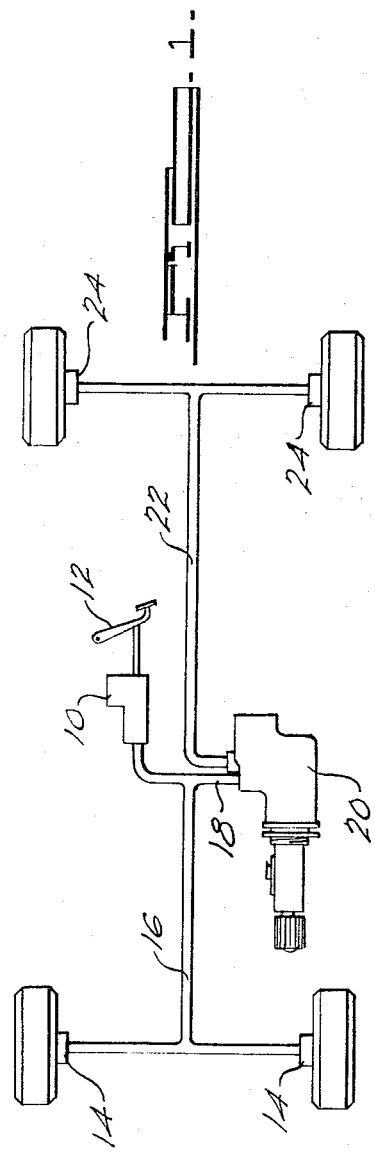
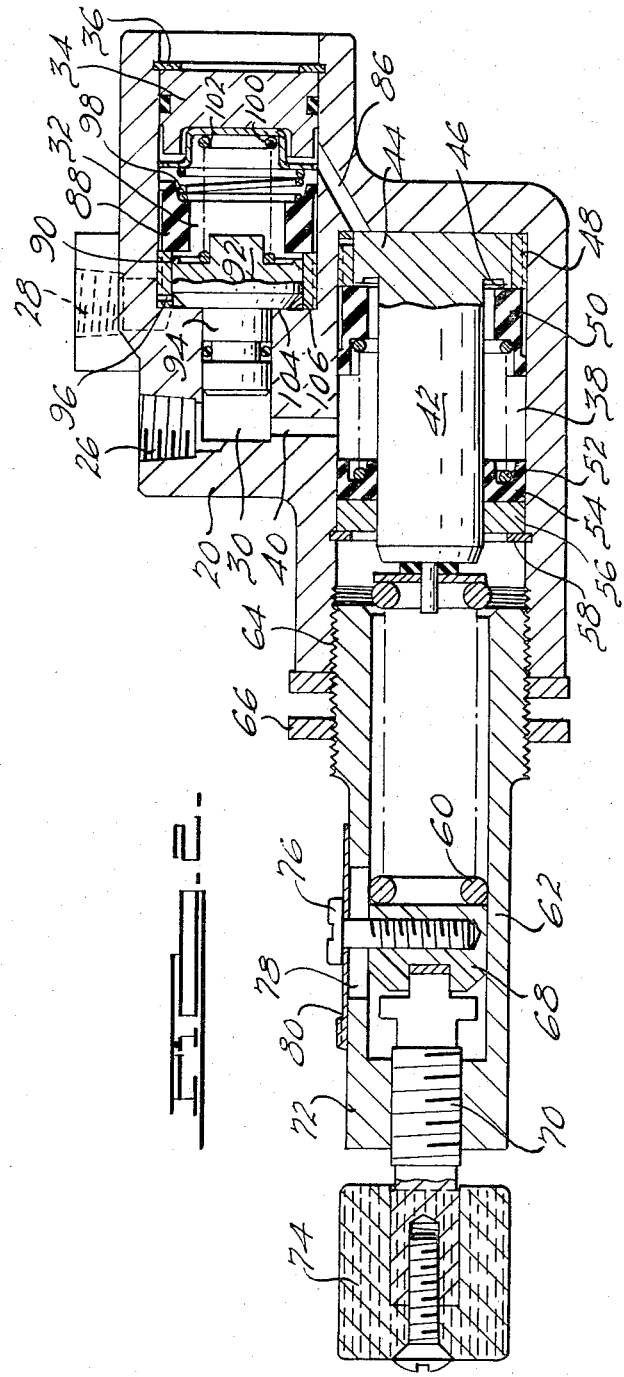
INVENTOR.
William Stelzer
BY
Harness, Dickey & Pierce
ATTORNEYS.

April 18, 1967 W. STELZER 3,314,235
BRAKE PRESSURE CONTROL VALVE
Filed July 26, 1965 2 Sheets-Sheet 2

INVENTOR.
William Stelzer
BY
Harness, Dickey & Pierce
ATTORNEYS.

United States Patent Office 3,314,235
Patented Apr. 18, 1967

3,314,235
BRAKE PRESSURE CONTROL VALVE
William Stelzer, Bloomfield Hills, Mich., assignor to Kelsey-Hayes Company, Romulus, Mich., a corporation of Delaware
Filed July 26, 1965, Ser. No. 474,729
7 Claims. (Cl. 60—54.5)

This invention relates to a pressure proportioning device for the hydraulic braking system of an automotive vehicle and particularly to a pressure proportioning device incorporating means to compensate for both the loading of the vehicle and the weight transfer occurring during deceleration of the vehicle.

It is an object of the present invention to provide a pressure proportioning device which will proportion the front and rear wheel brake pressures in such a manner as to obtain maximum utilization of the road adhesion at both front and rear axles.

It is another object of the present invention to provide a brake pressure control device which is particularly suited for use with trucks in which the weight on the rear axle varies considerably between loaded and unloaded conditions and which has manually adjustable means for controlling the relative pressurization of the front and rear brakes.

It is another object of the present invention to provide a pressure proportioning device of the above character incorporating means for indicating the type of loading for which the brakes have been set.

It is still another object of the present invention to provide a proportioning device of the above character which incorporates only one dynamic seal exposed to atmosphere, which is relatively simple and inexpensive in construction, which is reliable in operation and which is inexpensively fabricated.

These and other objects of the present invention will become apparent from the following detailed description taken in conjunction with the accompanying drawings, wherein:

FIGURE 1 is a schematic view of a vehicle brake system incorporating the proportioning device of the present invention;

FIG. 2 is an enlarged longitudinal sectional view of the proportioning device illustrated in FIG. 1;

Figure 3:
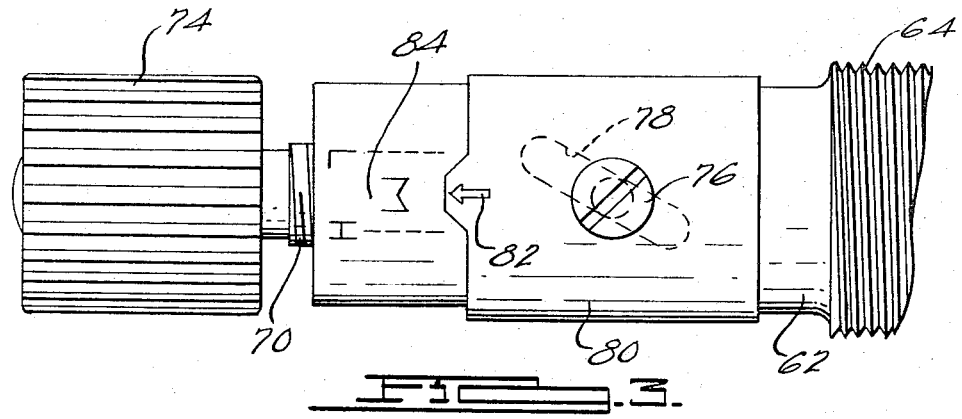
FIG. 3 is an enlarged plan view of a portion of the construction illustrated in FIG. 2.

In trucks which incorporate hydraulic braking systems, it is desirable to provide the rear wheel brakes with brake cylinders of a size sufficient to properly brake the vehicle when it is fully loaded. It will be understood that a greater percentage of the load is ordinarily carried by the rear wheels. If the rear brakes are not provided with such large brake cylinders, then the brakes may be ineffective to properly stop a fully loaded vehicle. On the other hand, there are several conditions under which it is highly desirable to reduce the braking effort delivered by the rear brakes of a truck. One such condition is when the truck is unloaded or is only partially loaded. The other condition exists during a high energy stop when the phenomenon of weight transfer is experienced. This phenomenon is well known to those familiar with the engineering of brakes and it refers to the fact that during deceleration, a portion of weight borne by the rear wheels is transferred to the front wheels. The greater the rate of deceleration, the greater will be the magnitude of the weight transfer. During rapid deceleration, a great enough portion of the weight borne by the rear wheels is transferred to the front wheels to make it desirable to reduce the proportion of the braking effort at the rear wheels to the braking effort at the front wheels. Such a reproportioning of the braking effort will prevent premature rear wheel skidding with its consequent loss of control of the vehicle. It will also enable the vehicle to be stopped in a shorter distance because a greater percentage of the maximum braking effort of each wheel will be utilized before any of the wheels begin to skid.

The present invention is characterized by the use of two interconnected pressure proportioning valves, the first of which may be set to cause reproportioning of the brake pressures at a relatively low level when the vehicle is unloaded or only partially loaded, and the second of which will effect a further reproportioning in brake pressure when the difference between master cylinder pressure and the pressure delivered from the first valve reaches a predetermined level.

Referring now to the drawings, and particularly to FIG. 1, there is shown a pressure producing device in the form of the usual master cylinder 10 which is operated by a standard brake pedal 12. The master cylinder 10 serves to displace fluid directly to a pair of front wheel brake cylinders 14 through a conduit 16. Brake fluid is also displaced by the master cylinder 10 through a conduit 18 to a housing 20. Brake fluid travels from the housing 20 through a conduit 22 leading to a pair of rear wheel brake cylinders 24.

Turning now to FIG. 2, the housing 20 will be seen to have an inlet opening 26 to which the conduit 18 is connected, and an outlet opening 28 to which the conduit 22 is connected. By this means, the housing serves to receive fluid from the master cylinder 10 and deliver fluid to the rear brake cylinders 24. The inlet opening 26 communicates with the left-hand end of a bore 30 formed in the housing 20. The bore 30 is open at its right-hand end to a first chamber 32, which is closed at its right-hand valve by a closure member 34. The closure member 34 is held in place by a snap ring 36.

Communication is also provided from the inlet opening 26 to a second housing chamber 38 through a passage 40. A piston 42 is positioned in the chamber 38 and is provided with a flange 44 at its right-hand end which serves as a valve element and has an annular valve shoulder 46 formed thereon. The flange 44 slides in a loose fitting sleeve 48 disposed at the right-hand end of the chamber 38. The valve shoulder 46 will be seen to engage one end of an annular elastomeric valve seat member 50 which is normally held against the sleeve 48 by a coil spring 52 and which sealingly engages the wall of the chamber 38. The valve shoulder 46 will be seen to nular cup seal 54 to hold it in abutment with an annular backup member 56. The member 56, in turn, abuts a snap ring 58.

It will be seen that the left-hand end of the piston 42 is exposed to atmospheric pressure and is also subject to a mechanical force from a heavy coil spring 60. The spring 60 is enclosed within a sleeve-shaped guide member 62 which has threads 64 by means of which it is threaded into the left-hand end of the housing 20. The guide member 62 is threaded a desired distance into the housing and then locked in place by a nut 66. The spring 60 is seated at its left-hand end against a spring seat member 68 which is held in a selected position with respect to the guide member 62 by means of an adjusting screw 70, threaded through an end wall 72 of the guide member. A handle 74 is positioned on the left-hand end of the adjusting screw 70, permitting the adjusting screw 70 to be manually rotated and adjust the position of the spring seat 68 along the axis of the spring 60. The spring seat 68 carries a cap screw 76 which projects through a slot 78 formed in the wall of the guide member 62 at an angle with respect to the axis of the spring 60. For this reason, when the spring seat 68 is advanced axially along the guide member 62 it is caused to rotate by the engagement of the walls of the slot 78 with the screw 76. This, in turn, produces angular movement of an indicator member 80 carried by the screw 76 adjacent the outer periphery of the guide member 62. As the indicator member 80 rotates, a pointer 82 thereon will move between various indicia 84 formed on the outer periphery of the guide member 62 to indicate whether the spring has been set for a lightly loaded vehicle, a heavily loaded vehicle or medium loaded vehicle. As the spring seat 68 is adjusted along the guide member 62, the force which the spring 60 will deliver to the piston 42 is varied. When the spring is highly loaded, the pointer 82 and indicia indicate a setting for a heavily loaded vehicle and when the spring is lightly loaded, a setting for an empty loading is indicated.

The remaining parts of the structure illustrated herein will be described in conjunction with the operation of the device. When the vehicle operator depresses the brake pedal to energize the master cylinder 10, fluid pressure is delivered through the conduit 18 directly to the front wheel brake cylinders 14, and the degree of pressurization of the brake cylinders 14 is dependent solely upon the output of the master cylinder 10. The structure enclosed within the housing 20 serves only to modify the brake pressure delivered to the rear brake cylinders 24. However, this does vary the ratio of front to rear pressure and the proportion of braking torque at the front and rear axles. Fluid enters the housing 20 through the inlet opening 26 and passes through the passage 40 to the chamber 38. From this chamber, fluid can flow through the annular space between the piston 42 and the inner periphery of the valve seat member 50, through the space between the valve shoulder 46 and the valve seat member 50, through the clearance existing between the sleeve 48 and the flange 44 and wall of the chamber 38, to a passage 86 which connects the right-hand end of the chamber 38 to the chamber 32. From the chamber 32, brake fluid can flow to the outlet 28 through the space between a valve seat member 88 and an annular valve shoulder 90 formed on an enlarged valve head 92 machined at one end of a piston 94. It will be seen that the piston 94 is sealingly but slidingly disposed in the bore 30. A sleeve 96 surrounds the valve head 92 but it has sufficient clearance with the valve head and the wall of the chamber 32 to permit fluid to flow past it. The valve seat member 88 is held against one end of the sleeve 96 by means of a coil spring 98, which, in turn, bears against a stamping 100, which is engageable with the closure member 34. A second coil spring 102 is also seated against the stamping 100, but it bears against the valve head 92 to urge it in a left-hand direction in which a shoulder 104 thereon seats against a radial shoulder 106 between the bore 30 and chamber 32.

From the foregoing description it will be apparent that an open path providing free communication from the inlet 26 to the outlet 28 is provided by the housing 20. This path will remain open during extremely light braking application, but at a predetermined pressure level of pressure from the master cylinder, the valve shoulder 46 will close against the valve seat 50 to close this path. The level at which this will occur is determined by the force which the spring 60 applies to the piston 42. This force can be manually set by rotation of the handle 74. The reason that the valve shoulder 46 will close is that master cylinder pressure acts against piston 42, attempting to move it to the left. This force is opposed by the force of the spring 60. The greater the force with which the spring acts, the higher the master cylinder pressure will have to be to cause the spring to yield. When the master cylinder pressure reaches a sufficiently high level, it will overcome the force of the spring and permit the valve shoulder 46 to close. Thereafter, additional increases in the master cylinder pressure at the inlet 26 will act against the left-hand side of the flange 44 and attempt to reopen the valve shoulder 46. This will cause the valve shoulder 46 to open just enough to bleed a small amount of fluid from the chamber 38 to the passage 46 and thence to the chamber 32. However, the increased pressure delivered to the passage 86 will act against the right-hand side of the valve flange and attempt to reclose the valve shoulder. In practice, the valve shoulder 46 will remain closely adjacent the valve seat 50, alternately opening and closing the valve shoulder 46. The area of the flange 44 against which outlet or rear brake pressure acts is substantially larger than the area of the flange 44 against which the opposing force of inlet or master cylinder pressure acts. Therefore, the rear brake pressure will not have to go up as much as master cylinder pressure in order to balance the forces acting on the piston 42 and flange 44. For this reason, the pressure of fluid delivered through the passage 86 to the chamber 32 will increase at a lower rate than the pressure in the chamber 38.

From the foregoing, it will be appreciated that the piston 42, with its valve shoulder 46, performs a pressure proportioning function which is commenced in accordance with the setting of the force delivered by a spring. If a truck having large rear wheel brake cylinders is very lightly loaded or is empty, it is highly desirable that the level of pressure delivered to the rear brake cylinders be reduced with respect to the pressure delivered to the front wheel brake cylinders as soon after braking is begun as is possible. For this reason, the spring 60 is caused to deliver a very light force to the piston 42 when the vehicle is lightly loaded. This will permit the valve shoulder 46 to close at a very low level of master cylinder pressure and thereby reduce the pressure of the fluid delivered to the chamber 32 almost immediately after the brakes are applied. Accordingly, the valve element represented by the flange 44 and valve shoulder 46 may be designated as a load control valve which proportions the pressures delivered to the various brake cylinders in accordance with the loading of the vehicle.

During application of the brakes after closure of the valve shoulder 46, the pressure of the fluid within the chamber 32 will be reduced with respect to the pressure in the bore 30 which acts against the left-hand end of the piston 94. The pressure acting against the left-hand end of the piston 94 creates a force which is opposed by the pressure within the chamber 32 acting against the valve head 92 over an effective area equal to the diameter of the piston 94. This latter pressure is assisted by the force of the spring 102, which is normally sufficient to keep the valve shoulder 90 open. However, when the pressure in the chamber 32 is sufficiently reduced with respect to pressure within the bore 30, the force produced by the pressure in the bore 30 will cause the spring 102 to yield and move the valve shoulder 90 to the right against the valve seat member 88. When this occurs, direct fluid communication between the chamber 32 and the outlet 28 is interrupted. However, further increases in pressure within the chamber 32 will attempt to reopen the valve shoulder 90 to deliver additional pressure to the outlet 28. Any increased pressure at the outlet 28 will act against the left-hand side of the piston head 92, tending to cause the valve shoulder 90 to reclose against the valve seat 88. In practice, the valve shoulder 90 will remain closely adjacent the valve seat 88, alternately opening and closing in order to increase the pressure at the outlet 28 at lesser rate than the pressure in the chamber 32 is increased.

The valve seat 90 is caused to open and close through the functioning of the piston 94, which compares master cylinder pressure in the bore 30 to the pressure in the chamber 32 received from the load control pressure proportioning valve shoulder 46. Accordingly, the valve head 92 and its valve shoulder 90 produce a second reduction in fluid pressure delivered to the rear brake cylinders 24, and this second reduction takes into account the weight transfer from the rear wheels to the front wheels during rapid deceleration, which is to be expected when master cylinder pressure has increased to a sufficient point to produce the necessary differential in pressure between the chamber 32 and bore 30 to enable the valve shoulder 90 to close.

Figure 4:
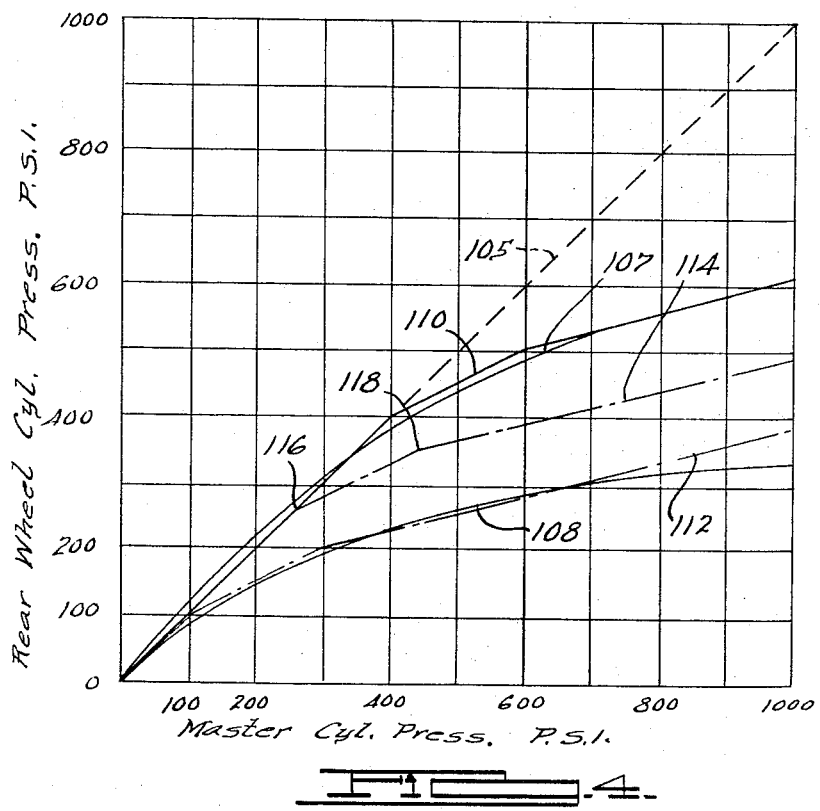
FIG. 4 is a graph illustrating the braking pressures which can be produced by the use of the proportioning device of the present invention.

Referring now to FIG. 4, a chart is illustrated which indicates the pressure at the rear wheel brake cylinders 24 as a function of master cylinder pressure. The line 105 indicates the rear wheel brake pressure that would be produced in the absence of the use of the device of the present invention. The line 107 indicates the ideal rear brake wheel pressure for a vehicle which is heavily loaded, while the line 108 indicates the ideal brake pressure for a vehicle which is empty. The line 110 indicates the brake pressure which will be obtained with maximum compression of spring 60 to approximate line 107, and the line 112 indicates the brake pressure that can be obtained by minimum compression of the spring 60 in an effort to approximate line 108. Line 114 indicates the rear brake pressure which will be obtained by a medium tensioning of the spring 60 and which lies generally in the middle of the desired ranges of pressures. Looking now at the line 114, the point 116 on this line indicates the point at which the valve shoulder 46 closes against the valve seat 50, while the point 118 on this line indicates the point at which the valve shoulder 90 closes against the valve seat 88. By varying the point 116 through rotation of the handle 74, the ratio between master cylinder pressure and rear wheel brake pressure will closely approximate the ideal curve for the particular loading of the vehicle. In this connection, it may be pointed out that the extent to which the guide member 62 is threaded into the housing 20 can be varied so that the range of forces delivered by the spring 60 will be within the desired ranges for a particular vehicle with which the device is being used. Of course, it is also possible to use a different spring 60, depending upon the vehicle with which the device is being used.

The only dynamic seal through which fluid can possibly leak to atmosphere in the device of the present invention is the seal 52. Any leakage past the seal of the piston 94 will not result in external leakage. For this reason, the device of the present invention possesses a high degree of reliability. It will also be noted that because the piston 94 compares pressure from the first valve (valve shoulder 46) to master cylinder pressure rather than to atmosphere, the point 118 on the graph will always occur at a suitable interval after the point 116, irrespective of the compression of the spring 60. In other words, the wheel cylinder pressure at which the point 118 will occur is a function of the master cylinder pressure at which the point 116 occurred, and the operation of the valve seat 88 is keyed to the operation of the valve shoulder 46.

In referring to the members 42 and 94 as piston, the word "piston" is meant to include any differential pressure-responsive members including plungers, diaphragms, and the like. Further, the word "valve" is intended to refer to any member, portion of a member, shoulder or the like operable to seal against a surface to open or close a path of fluid travel. Finally, the expression "master cylinder," as used in the claims, is intended to refer to any pressure producing device suitable for a hydraulic brake system.

While the preferred form of the invention illustrated herein is well calculated to fulfill the objects above stated, it will be apparent that the invention is susceptible of modification, variation and change without departing from the fair scope or meaning of the subjoined claims.

What is claimed is:

1. In a vehicular hydraulic brake system having a master cylinder and a plurality of brake cylinders adapted to be pressurized by said master cylinder, that improvement which comprises a first pressure proportioning valve interposed between said master cylinder and at least one of said brake cylinders, said first valve being operable to reduce the pressure of fluid discharged therefrom with respect to master cylinder pressure after a predetermined initial brake application, means for varying the degree of said initial brake application, a second fluid pressure proportioning valve arranged between said first valve and said at least one brake cylinder and a piston for operating said second valve, said piston being operable to compare the pressure of fluid discharged from said first valve to master cylinder pressure and to actuate said second valve after the pressure of fluid discharged from said first valve is reduced with respect to master cylinder pressure.

2. In a vehicular hydraulic brake system having a master cylinder and a plurality of brake cylinders adapted to be pressurized by said master cylinder, that improvement which comprises a first pressure proportioning valve interposed between said master cylinder and one of said brake cylinders, a first piston for operating said first valve, said first piston having a portion thereof exposed to master cylinder pressure and an opposing portion exposed to atmospheric pressure, a spring biasing said first piston in a direction assisting atmospheric pressure, means for varying the force said spring delivers to said first piston, said first valve being operable to reduce the pressure of fluid discharged therefrom with respect to master cylinder pressure after master cylinder pressure reaches a level sufficient to move said piston against said spring, a second fluid pressure proportioning valve arranged between said first valve and said one brake cylinder and a second piston for operating said second valve, said second piston having a portion exposed to the pressure of fluid discharged from said first valve and an opposing portion exposed to fluid motor pressure, yieldable means biasing said second piston in a direction assisting the pressure of fluid discharged from said first valve whereby said second valve will close when the difference between master cylinder pressure and the pressure of fluid discharged from said first valve reaches a level sufficient to move said second piston against said spring, said second valve being operable to reduce the pressure of fluid discharged therefrom with respect to the pressure of fluid received from said first valve.

3. In a vehicular hydraulic brake system having a master cylinder and a plurality of brake cylinders adapted to be pressurized by said master cylinder, that improvement which comprises a first pressure proportioning valve interposed between said master cylinder and one of said brake cylinders, a first piston exposed to master cylinder pressure for opening and closing said first valve, a spring biasing said first piston in a direction opposing master cylinder pressure and tending to maintain said first valve open, means for varying the force with which said spring biases said first piston to control the level of master cylinder pressure at which said valve will first close, a second fluid pressure proportioning valve connected between said first valve and said one brake cylinder and a second piston for operating said second valve, said second piston being exposed to master cylinder pressure and the pressure of fluid discharged from said first valve on opposite sides thereof, yieldable means biasing said second piston in a direction assisting the pressure of fluid discharged from said first valve whereby said second valve will close upon the occurrence of a sufficient differential between master cylinder pressure and the pressure of fluid discharged from said first valve, said second valve being operable to effect a reduction in the pressure of fluid discharged therefrom with respect to the pressure of fluid discharged from said first valve.

4. In a vehicular hydraulic brake system having a master cylinder and a plurality of brake cylinders adapted to be pressurized by said master cylinder, that improvement which comprises a differential pressure responsive first pressure proportioning valve interposed between said fluid motor and one of said brake cylinders, said valve being biased toward a closed position by master cylinder pressure, a spring biasing said valve toward an open position, means for selecting the force with which said spring biases said valve, a differential pressure responsive second pressure proportioning valve arranged to receive fluid discharged from said first valve and deliver fluid to said one brake cylinder, said second valve being biased toward a closed position by fluid motor pressure and toward an open position by the pressure of fluid received from said first valve, yieldable means biasing said second valve in a direction assisting the pressure of fluid received from said first valve whereby said second valve will close upon the occurrence of a difference between master cylinder pressure and the pressure of fluid received from said first valve sufficient to cause said yieldable means to yield.

5. In a vehicular hydraulic brake system having a master cylinder and a plurality of brake cylinders adapted to be pressurized by said master cylinder, that improvement which comprises a differential pressure responsive first pressure proportioning valve interposed between said master cylinder and at least one of said brake cylinders, said valve being biased toward a closed position by master cylinder pressure, a coil spring biasing said valve toward an open position, a seat for said spring, threaded means for adjusting the position of said seat along the axis of said spring, a handle for said threaded means by which said threaded means may be manually rotated, a differential pressure responsive second pressure proportioning valve arranged to receive fluid discharged from said first valve and deliver fluid to said one brake cylinder, said second valve being biased toward a closed position by master cylinder pressure and toward an open position by the pressure of fluid received from said first valve, yieldable means biasing said second valve in a direction assisting the pressure of fluid received from said first valve whereby said second valve will close upon the occurrence of a difference between master cylinder pressure and the pressure of fluid received from said first valve sufficient to cause said yieldable means to yield.

6. In a vehicular hydraulic brake system having a master cylinder and a plurality of brake cylinders adapted to be pressurized by said master cylinder, that improvement which comprises a differential pressure responsive first pressure proportioning valve interposed between said master cylinder and at least one of said brake cylinders, said valve being biased toward a closed position by master cylinder pressure, a coil spring biasing said valve toward an open position, a seat for said spring, threaded means for adjusting the position of said seat along the axis of said spring, a handle for said threaded means by which said threaded means may be manually rotated, an indicator connected to said seat, fixed indicia means with respect to which said indicator is movable as said seat is adjusted for indicating the degree of adjustment of said seat, a differential pressure responsive second pressure proportioning valve arranged to receive fluid discharged from said first valve and deliver fluid to said one brake cylinder, said second valve being biased toward a closed position by fluid motor pressure and toward an open position by the pressure of fluid received from said first valve, yieldable means biasing said second valve in a direction assisting the pressure of fluid received from said first valve whereby said second valve will close upon the occurrence of a difference between master cylinder pressure and the pressure of fluid received from said first valve sufficient to cause said yieldable means to yield.

7. In a vehicular hydraulic brake system having a master cylinder and front and rear brake cylinders adapted to be pressurized by said master cylinder, that improvement which comprises a housing having an inlet, a first bore communicating with said inlet, a second bore, a passage communicating said first and second bores, and an outlet communicating with said second bore, said inlet being arranged to receive fluid from said master cylinder and said outlet being arranged to deliver fluid to said rear brake cylinders; a first valve disposed in said first bore and operable to reduce the pressure of fluid flowing through said passage with respect to master cylinder pressure; a first piston formed integrally with said first valve; said first piston being exposed to atmospheric pressure on one side thereof and to fluid motor pressure on the other side thereof; a first spring biasing said first piston in a direction assisting atmospheric pressure and normally operable to keep said first valve open; means for varying the force with which said first spring biases said first piston; a second valve disposed in said second bore operable to reduce the pressure of fluid flowing through said second bore from said passage; a second piston integrally formed with said second valve, said second piston being exposed to master cylinder pressure on one side thereof and the pressure of fluid from said passage on the other side thereof; and a second spring biasing said second piston in a direction assisting the pressure of fluid from said passage, said second spring being operable to hold said second valve open until the pressure of fluid from said passage has been reduced a predetermined amount with respect to master cylinder pressure.

No references cited.

MARTIN P. SCHWADRON, *Primary Examiner.*

R. R. BUNEVICH, *Assistant Examiner.*